(12) United States Patent
Schulba

(10) Patent No.: US 6,419,054 B1
(45) Date of Patent: Jul. 16, 2002

(54) COOLING SYSTEM FOR A BRAKE

(76) Inventor: Gerald Schulba, 645 Harbor Blvd., Belmont, CA (US) 94002

( * ) Notice: Subject to any disclaimer, the term of this patent is extended or adjusted under 35 U.S.C. 154(b) by 0 days.

(21) Appl. No.: 09/668,892

(22) Filed: Sep. 21, 2000

Related U.S. Application Data

(60) Provisional application No. 60/155,162, filed on Sep. 21, 1999.

(51) Int. Cl.$^7$ ................................................ F16D 55/02
(52) U.S. Cl. ..................................................... 188/71.6
(58) Field of Search ............................... 188/71.1, 71.3, 188/71.6, 71.5, 18 A, 72.4, 73.32, 264 R, 264 B, 264 D, 264 E, 264 F; 192/70.12, 113 R, 113 B

(56) References Cited

U.S. PATENT DOCUMENTS

| | | |
|---|---|---|
| 2,821,437 A | 1/1958 | Lesher |
| 2,958,399 A | 11/1960 | Osborne |
| 3,918,558 A | 11/1975 | Bryant |
| 4,771,822 A | 9/1988 | Barbosa |
| 5,190,123 A * | 3/1993 | Hvolka ..................... 188/71.6 |
| 5,651,431 A * | 7/1997 | Kyrtsos .................. 188/1.11 L |
| 5,812,053 A * | 9/1998 | Kovack ..................... 340/449 |
| 5,879,466 A * | 3/1999 | Creger ........................ 134/18 |

* cited by examiner

Primary Examiner—Paul N. Dickson
Assistant Examiner—C. T. Bartz
(74) Attorney, Agent, or Firm—Young & Basile, P.C.

(57) ABSTRACT

A cooling system for a brake having at least one pad and a surface engagable by the at least one pad. The cooling system includes a source of coolant and at least one nozzle operably positionable to spray the surface of the brake. A valve operates to supply coolant from the source of coolant to the at least one nozzle in response to an actuation signal. A temperature sensor is operably positionable to measure a temperature of the surface of the brake and generate a signal corresponding the measured temperature. A control unit receives the signal corresponding to the measured temperature from the temperature sensor and generates and transmits the actuation signal to the valve in accordance with a control program stored in memory.

20 Claims, 3 Drawing Sheets

COOLING SYSTEM FOR A BRAKE

CROSS-REFERENCES TO RELATED APPLICATIONS

This application claims the benefit of U.S. Provisional Application No. 60/155,162, filed Sep. 21, 1999.

FIELD OF THE INVENTION

The present invention relates to a cooling system for a brake and, more particularly, to a cooling system for a set of vehicle brakes.

BACKGROUND OF THE INVENTION

When the brakes of a vehicle are applied, a substantial amount of heat is generated. The high heat can adversely effect braking systems in many ways. Specifically, the high temperature can produce brake fade or, in other words, reduce brake effectiveness. The high heat can also prematurely deteriorate and/or distort brake components such as brake discs, brake drums, and/or brake linings or pads. Further, the high temperature can boil hydraulic brake fluid. Accordingly, the dissipation of heat is a large obstacle to maintaining and improving the performance of vehicle brake systems.

SUMMARY OF THE INVENTION

A cooling system for a brake having at least one pad and a surface engagable by the at least one pad. The cooling system includes a source of coolant and at least one nozzle operably positionable to spray the surface of the brake. A valve operates to supply coolant from the source of coolant to the at least one nozzle in response to an actuation signal. A temperature sensor is operably positionable to measure a temperature of the surface of the brake and generate a signal corresponding the measured temperature. A control unit receives the signal corresponding to the measured temperature from the temperature sensor and generates and transmits the actuation signal to the valve in accordance with a control program stored in memory.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
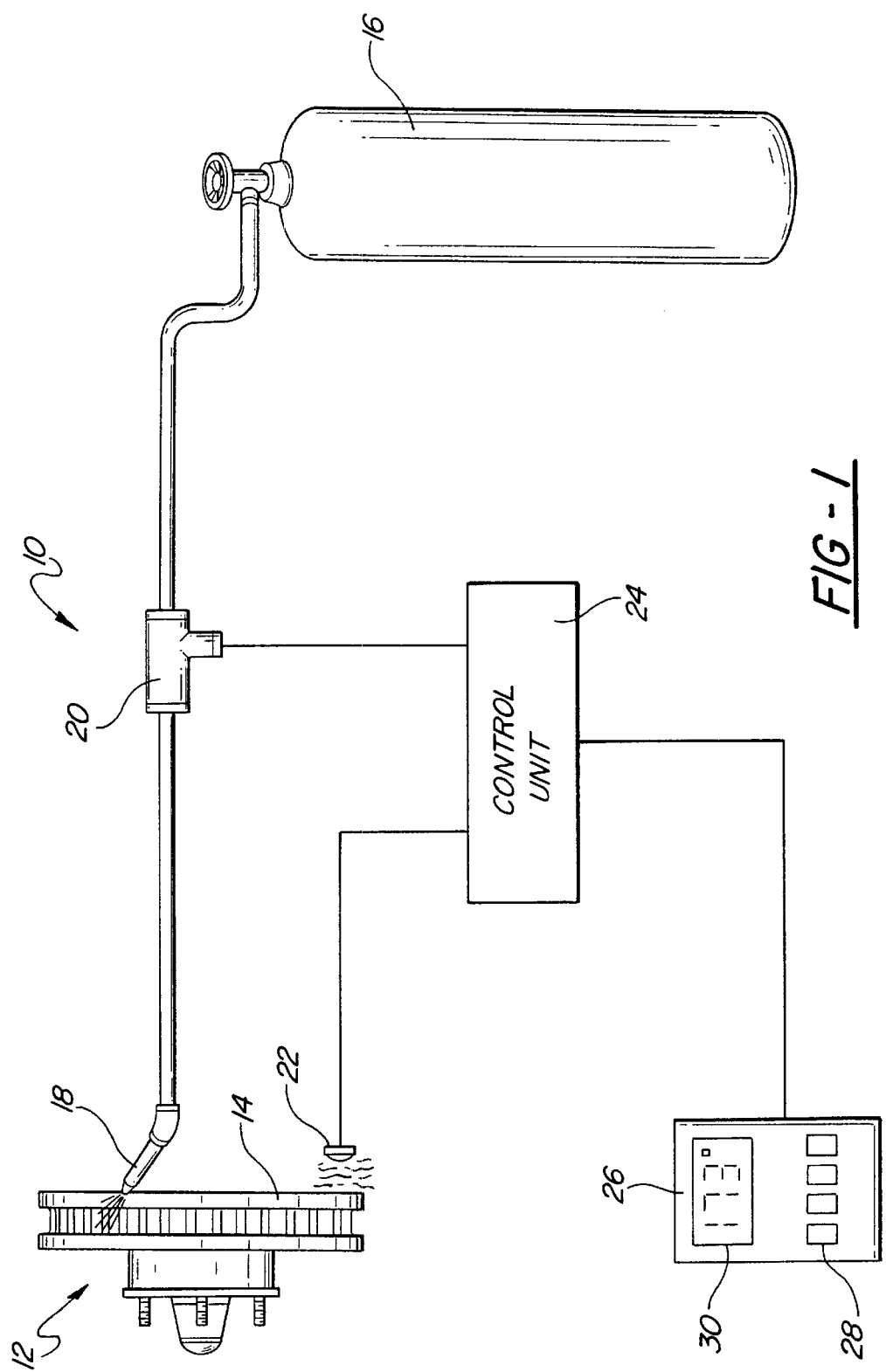
FIG. 1 is a schematic illustration of a cooling system for a brake in accordance with the present invention.

FIG. 1 is a schematic illustration of a cooling system 10 for a brake 12 in accordance with the present invention. The present invention is particularly adapted to cool a brake 12 having at least one pad and a surface 14 engagable by the at least one pad. As a result, the system 10 may be used to cool several different types of brakes including a,brake drum and/or a brake disc or rotor (as illustrated in FIG. 1) as are conventional in automotive vehicles.

The cooling system 10 includes a source of coolant 16, at least one nozzle 18, a valve 20, a temperature sensor 22, and a control unit 24. Typically, the source of coolant 16 is a cannister or tank filled with a fluid. Preferably, the coolant is liquidified nitrogen or carbon dioxide ($CO_2$). The at least one nozzle 18 is positioned to spray the surface 14 of the brake 12. In FIG. 1, the nozzle 18 is positioned in relation to the disc brake 12 for schematic purposes only. Testing has shown that one particularly effective spray direction is achieved by orienting the nozzle 18 to spray coolant radially outward from the center axis of the disc brake 12 directing some coolant through vent openings formed in the periphery of the disc brake 12. The valve 20 is operated to supply coolant from the source of coolant 16 to the at least one nozzle 18 in response to a valve actuation signal. The temperature sensor 22 is positioned to measure a temperature of the surface 14 of the brake 12 and generate a signal corresponding the measured temperature. Preferably, the temperature sensor 22 is an infrared heat sensor which can be positioned a spaced distance from the surface 14 of the brake 12 yet still measure the temperature of the surface 14. The control unit 24 receives the measured temperature signal from the temperature sensor 22 and generates and transmits the valve actuation signal to the valve 20 in accordance with a control program stored in memory.

The control program preferably includes a programmable temperature threshold. The control unit 24 generates the valve actuation signal when the measured temperature is greater than the programmable temperature threshold. In this manner, the system 10 provides automatic brake cooling based on a pre-programmed or factory programmed temperature threshold. The cooling system 10 further includes an input/output device 26 in electrical communication with the control unit 24 for programming the programmable temperature threshold. In this manner, the system 10 provides automatic brake cooling based on a temperature threshold selected and programmed by an operator or user.

Optionally, the cooling system 10 can include manual override activation means 28, illustrated in FIG. 1 as a switch in the input/output device 26, for controlling the actuation of the valve 20 independent of the control program. When the manual override activation means is activated, a manual override activation signal is transmitted to the control unit 24 commanding the generation of a valve actuation signal independent of the measured temperature signal. In this manner, an operator or user can manually activate the system 10 to spray coolant on the surface 14 of the brake 12 without regard to the measured temperature of the brake 12.

Further, the cooling system 10 can include a display 30, illustrated in FIG. 1 as mounted to the input/output device 26, for displaying the measured temperature from the temperature sensor 22. The display 30 can be numerical or provide indicia illustrating the present measured temperature relative to the programmable temperature threshold. For example, the display 30 can include a liquid crystal display (LCD) (as illustrated in FIG. 1) and/or a series of light emitting diodes (LEDs).

Figure 2:
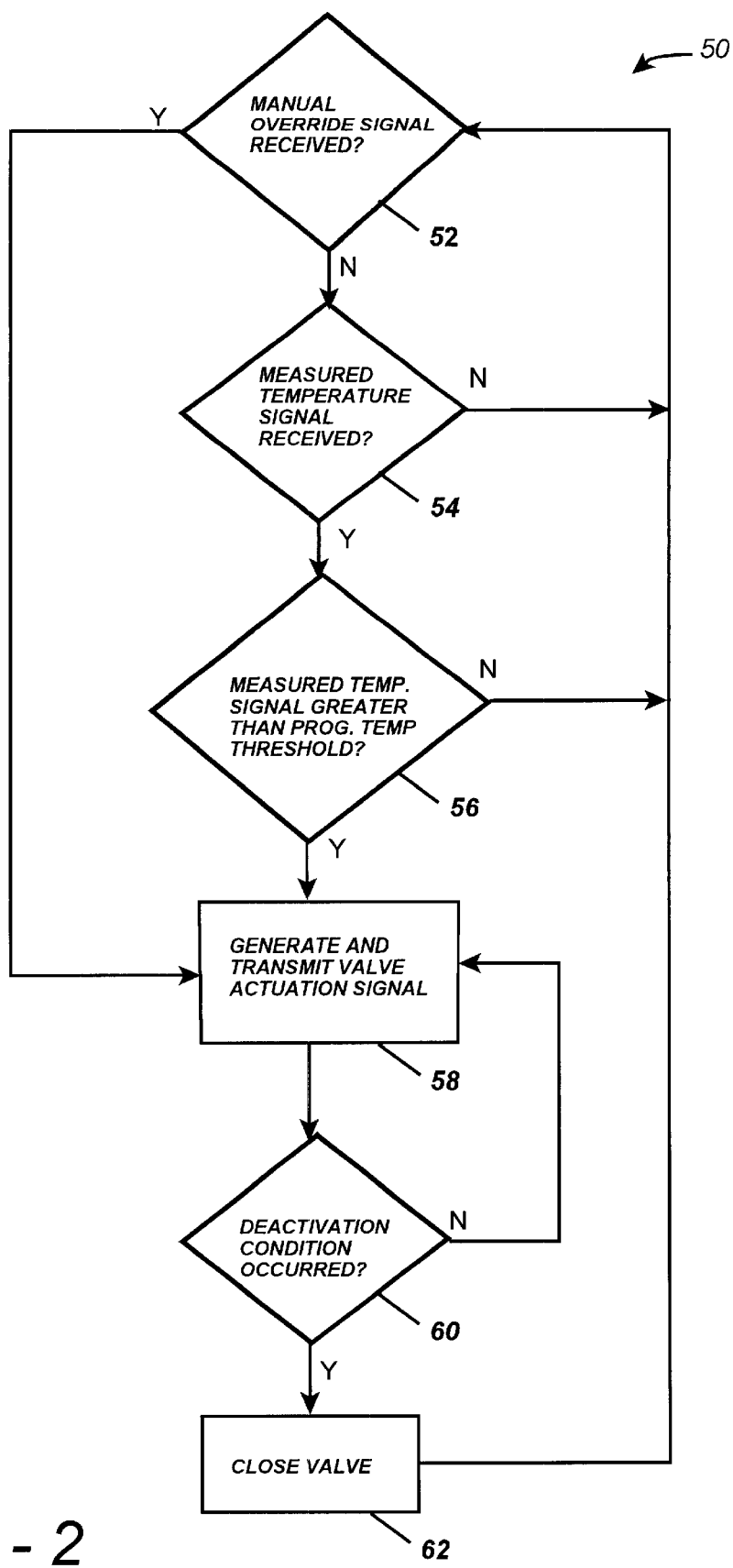
FIG. 2 is a simplified flow chart of a control program for a control unit in the cooling system.

FIG. 2 is a simplified flow chart of a control program 50 for the control unit 24 in the cooling system 10. The control program 50 starts with step 52 by determining whether a manual override activation signal has been received. If a manual override activation signal has been received, the control program 50 jumps to step 58 to generate a valve actuation signal. If a manual override activation signal has not been received, the control program 50 proceeds to step 54 to query whether a measured temperature signal from the temperature sensor has been received. If a measured temperature signal has not been received, the control program 50 jumps back to step 52. If a measured temperature signal has been received, the control program proceeds to step 56 to determined whether the measured temperature signal is greater than the programmable temperature threshold. If the measured temperature signal is not greater than the programmable temperature threshold, the control program 50 jumps back to step 52. If the measured temperature signal is greater than the programmable temperature threshold, the control program 50 proceeds to step 58 to generate and transmit a valve actuation signal and then to step 60 to query whether a deactivation condition has occurred. The deactivation condition may be (1) that the system 10 has sprayed coolant on the surface 14 of the brake 12 for a predetermined period of time, or (2) that the current measured temperature is presently less than the programmable temperature threshold. If the deactivation condition has not occurred, the control program 50 jumps back to step 58. If the deactivation condition has occurred, the control program 50 proceeds to step 62 to close the valve 20 and then returns back to step 52.

Within the scope of the present invention, the cooling system 10 can include a second nozzle positioned to spray the surface of a second brake, a second valve operating to supply coolant from the source of coolant to the second nozzle in response to a second valve actuation signal, and a second temperature sensor positioned to measure a temperature of the surface of the second brake and generate a signal corresponding to the measured temperature. In this embodiment of the present invention, the control unit 24 receives the measured temperature signal from the first temperature sensor 22 and the measured temperature signal from the second temperature sensor and independently generates and transmits the first valve actuation signal to the first valve 20 and the second valve actuation signal to the second valve in accordance with the control program 50. In this manner, the system 10 can operate to cool two or more brakes in response to the measured temperatures from the respective temperature sensors independent of one another. It should be apparent to those skilled in the art that the control program 50 according to the present invention can also be configured to control one or more valves to cool all brake surfaces simultaneously, if desired, without departing from the spirit and scope of the invention. A single valve can supply coolant to one or more nozzles directed to apply coolant to one or more brake surfaces as desired. Alternatively, each brake can have one valve associated therewith to supply coolant to the one or more nozzles directing coolant to the corresponding brake surface as directed by the control program 50 stored in memory.

The control program 50 may also be written to provide several additional control functions. More specifically, the control program 50 can operate to (1) control the actuation of the valve 20 to produce a continuous and/or pulsed spray of coolant from the nozzle 18, and (2) spray coolant on the surface 14 of the brake 12 for a predetermined period of time or until the present measured temperature is less than the programmable temperature threshold in a feedback arrangement.

Figure 3:
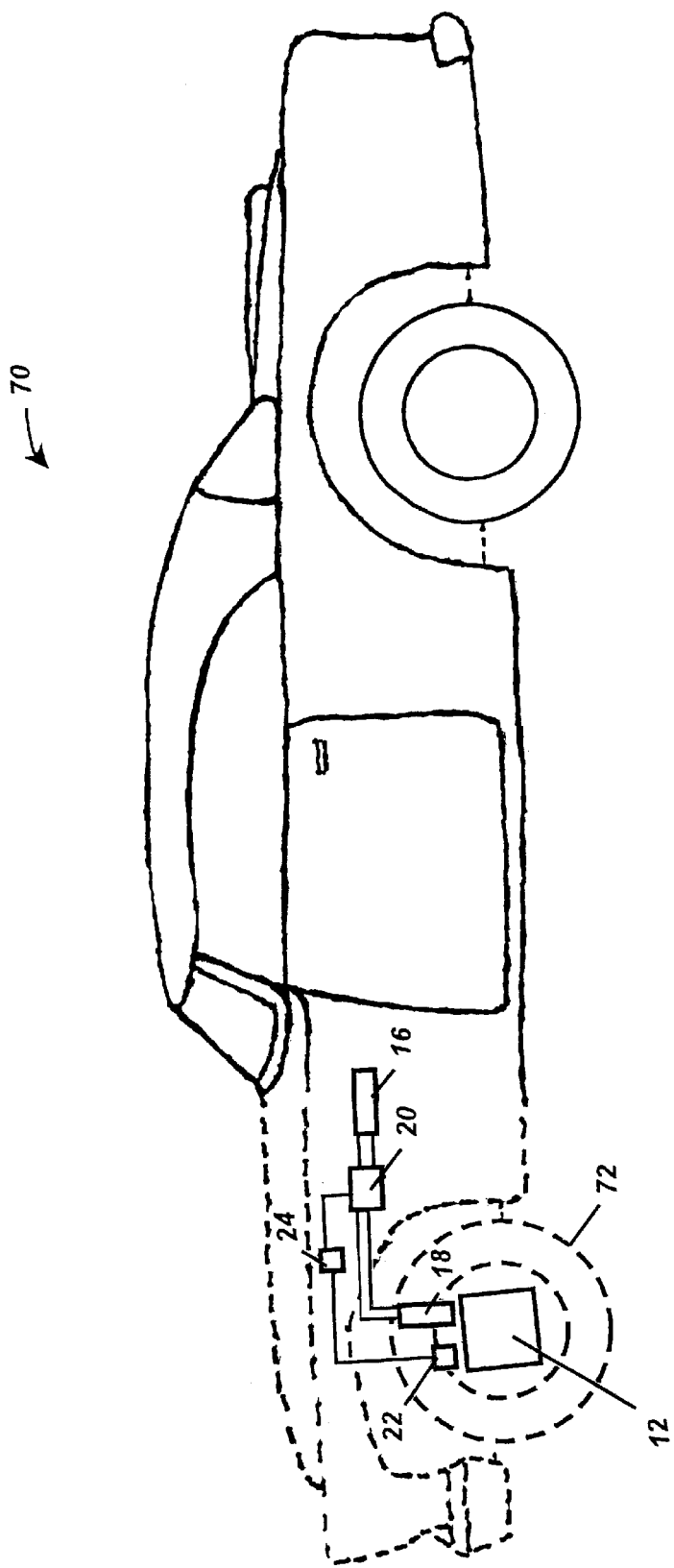
FIG. 3 is a simplified schematic illustration of the cooling system of FIG. 1 in an automotive vehicle.

FIG. 3 shows the cooling system of the present invention assembled in an automotive vehicle 70. The vehicle 70 includes a wheel 72 to which the brake 12 is connected.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cooling system for a brake having at least one pad and a surface engagable by the at least one pad comprising:
    a source of coolant;
    at least one nozzle operably positionable to spray coolant on the surface of the brake;
    a valve operable to supply coolant from the source of coolant to the at least one nozzle in response to an actuation signal;
    a brake temperature sensor operably positionable to measure a temperature of the surface of the brake and generate a signal corresponding the measured temperature; and
    a control unit for receiving the signal corresponding to the measured temperature from the temperature sensor and for generating and transmitting the actuation signal to the valve in accordance with a control program stored in memory.

2. The cooling system of claim 1 wherein the control program includes a programmable temperature threshold and the control unit generates the actuation signal when the measured temperature is greater than the programmable temperature threshold.

3. The cooling system of claim 2 including an input device in electrical communication with the control unit for programming the programmable temperature threshold.

4. The cooling system of claim 1 further comprising manual override activation means for controlling the actuation of the valve independent of the control program.

5. The cooling system of claim 1 including an output device having a display for displaying the measured temperature from the brake temperature sensor.

6. The cooling system of claim 1 wherein the brake temperature sensor is an infrared heat sensor which is operably positionable a spaced distance from the surface of the brake.

7. The cooling system of claim 1 wherein the coolant is one of liquified nitrogen and carbon dioxide.

8. The cooling system of claim 1 in combination with a vehicle wherein the brake is connected to at least one wheel of the vehicle, further comprising:
    the source of coolant mounted on the vehicle;
    the at least one nozzle positioned on the vehicle to spray coolant on the surface of the brake; and
    the brake temperature sensor positioned on the vehicle to measure a temperature of the surface of the brake and generate a signal corresponding the measured temperature.

9. A cooling system for a set of brakes including at least a first brake and a second brake, each brake having at least one pad and a surface engagable by the at least one pad comprising:
    a source of coolant;
    a first nozzle operably positionable to spray coolant on the surface of the first brake;
    a second nozzle operably positionable to spray coolant on the surface of the second brake;

a first valve operable to supply coolant from the source of coolant to the first nozzle in response to a first valve actuation signal;

a second valve operable to supply coolant from the source of coolant to the second nozzle in response to a second valve actuation signal;

a first brake temperature sensor operably positionable to measure a temperature of the surface of the first brake and generate a first temperature sensor signal corresponding the measured temperature;

a second brake temperature sensor operably positionable to measure a temperature of the surface of the second brake and generate a second temperature sensor signal corresponding the measured temperature; and a control unit for receiving the first temperature sensor signal and the second temperature sensor signal and for independently generating and transmitting the first valve actuation signal to the first valve and the second valve actuation signal to the second valve in accordance with a control program stored in memory.

10. The cooling system of claim 9 wherein the control program includes a programmable first temperature threshold and a programmable second temperature threshold and the control unit generates and transmits the first valve actuation signal to the first valve when the measured temperature from the first temperature sensor is greater than the programmable first temperature threshold and generates and transmits the second valve actuation signal to the second valve when the measured temperature from the second temperature sensor is greater than the programmable second temperature threshold.

11. The cooling system of claim 10 including an input device in electrical communication with the control unit for programming the programmable first temperature threshold and the programmable second temperature threshold.

12. The cooling system of claim 9 further comprising manual override activation means for controlling the actuation of at least one of the first valve and the second valve independent of the control program.

13. The cooling system of claim 9 including a display for selectively displaying the measured temperature from the first brake temperature sensor and the measured temperature from the second brake temperature sensor.

14. The cooling system of claim 9 wherein the first and second brake temperature sensors are infrared heat sensors which are operably positionable a spaced distance from the surface of the first and second brake respectively.

15. The cooling system of claim 9 wherein the coolant is one of liquified nitrogen and carbon dioxide.

16. The cooling system of claim 9 in combination with a vehicle wherein the set of brakes is connected to a set of wheels of the vehicle, further comprising:

the source of coolant mounted in the vehicle;

the first nozzle positioned on the vehicle to spray coolant on the surface of the first brake;

the second nozzle positioned on the vehicle to spray coolant on the surface of the second brake;

a first brake temperature sensor positioned on the vehicle to measure a temperature of the surface of the first brake and generate a first temperature sensor signal corresponding the measured temperature; and a second brake temperature sensor positioned on the vehicle to measure a temperature of the surface of the second brake and generate a second temperature sensor signal corresponding the measured temperature.

17. The cooling system of claim 2 wherein the actuation signal is one of a continuous and a pulsed signal.

18. A brake cooling system, comprising:

a vehicle having at least one brake mounted in a vehicle;

a reservoir for brake coolant mounted in the vehicle;

a nozzle positioned to spray the surface of the brake with brake coolant;

a valve supplying brake coolant from the reservoir to the nozzle in response to an actuation signal;

a brake temperature sensor positioned to measure a temperature of the brake and generate a signal corresponding the measured temperature; and a control unit for receiving the signal corresponding to the measured temperature from the brake temperature sensor and for generating and transmitting the actuation signal to the valve in accordance with a control program stored in memory.

19. The brake cooling system of claim 18 wherein the brake coolant is one of nitrogen and carbon dioxide.

20. The brake cooling system of claim 18 wherein the brake temperature sensor is an infrared heat sensor.

* * * * *